(12) United States Patent
Coslow (10) Patent No.: US 6,345,494 B1
(45) Date of Patent: Feb. 12, 2002

(54) SIDE SEAL FOR COMBUSTOR TRANSITIONS

(75) Inventor: Bill Coslow, Winter Park, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/666,683

(22) Filed: Sep. 20, 2000

(51) Int. Cl.[7] .............................. F02C 7/20; F02C 7/28; F02C 3/14
(52) U.S. Cl. ..................... 60/39.02; 60/39.32; 60/39.37
(58) Field of Search ............................. 60/39.31, 39.32, 60/39.37, 39.02, 722

(56) References Cited

U.S. PATENT DOCUMENTS

| | | | |
|---|---|---|---|
| 3,759,038 A | * 9/1973 | Scalzo et al. | 60/39.32 |
| 4,038,815 A | 8/1977 | Heitmann et al. | |
| 4,552,386 A | 11/1985 | Burchette | |
| 5,181,728 A | * 1/1993 | Stec | 277/53 |
| 5,400,586 A | * 3/1995 | Bagepalli et al. | 60/39.32 |
| 5,630,700 A | 5/1997 | Olsen et al. | |
| 5,706,646 A | * 1/1998 | Wilde et al. | 60/39.37 |

\* cited by examiner

Primary Examiner—Ted Kim (57) ABSTRACT

A sealing device for resisting the flow of gas through a labyrinth seal between a pair of adjacent combustor transitions of a gas turbine engine includes an elongated frame formed with a seat and a seal member disposed within the seat. The seal member is formed out of a metallic felt material and is progressively compressed within the labyrinth seal during initial engine startup, and provides resistance to leakage during steady state operation of the engine. The frame includes a first connection tab extending outwardly from the seat, the first connection tab being fixedly mounted on a ridge of the labyrinth seal. A second embodiment of the present invention is disclosed in which the frame includes a seat and both a first connection tab and a second connection tab extending outwardly from the seat in opposite directions. Both the first and second connection tabs are fixedly mounted on the combustor transition to provide attachments of the frame to the combustor transition both upstream and downstream from the seal member.

20 Claims, 5 Drawing Sheets

SIDE SEAL FOR COMBUSTOR TRANSITIONS

BACKGROUND OF THE INVENTION

1. Technical Field

The present invention relates generally to combustion gas turbine engines and, more particularly, to an improved seal for resisting leakage between and past combustor transitions in the combustor section of a combustion gas turbine gas engine. Specifically, the invention relates to a sealing device that includes a frame having a seal member mounted thereon, the seal member being manufactured out of a plurality of metal fibers.

2. Description of the Related Art

A combustion gas turbine engine is a device that includes a compressor section, a combustor section, and a turbine section. Large quantities of air are serially compressed in the compressor section, heated in the combustor section to such a state that its stored energy (relative to the surrounding conditions) is more than that required by the compressor section, and expanded through the turbine section. The turbine section develops sufficient power to at least drive the compressor section and preferably is capable of driving accessory equipment such as electrical generators and other such devices.

During the heating process, fuel is added to the air and the mixture is burned in the combustor section. In its simplest form, the rotating compressor and turbine components are directly connected on a common shaft, and excess power to drive the accessory equipment is directly extracted from the compressor-turbine shaft. The excess power output may additionally be extracted in the form of thrust or in the form of pneumatic power, depending upon the particular design of the engine and the specific application thereof.

In the operation of such engines, it is particularly preferred to maximize the efficiency of operation and to reduce the emissions resulting therefrom. Inasmuch as such engines typically operate at elevated temperatures and pressures, the leakage of air along unintended or undesirable flow paths can negatively impact the efficiency and/or emissions produced by the engine. It is thus preferred, as a general matter, to reduce undesired leakage within combustion gas turbine engines.

Figure 9:
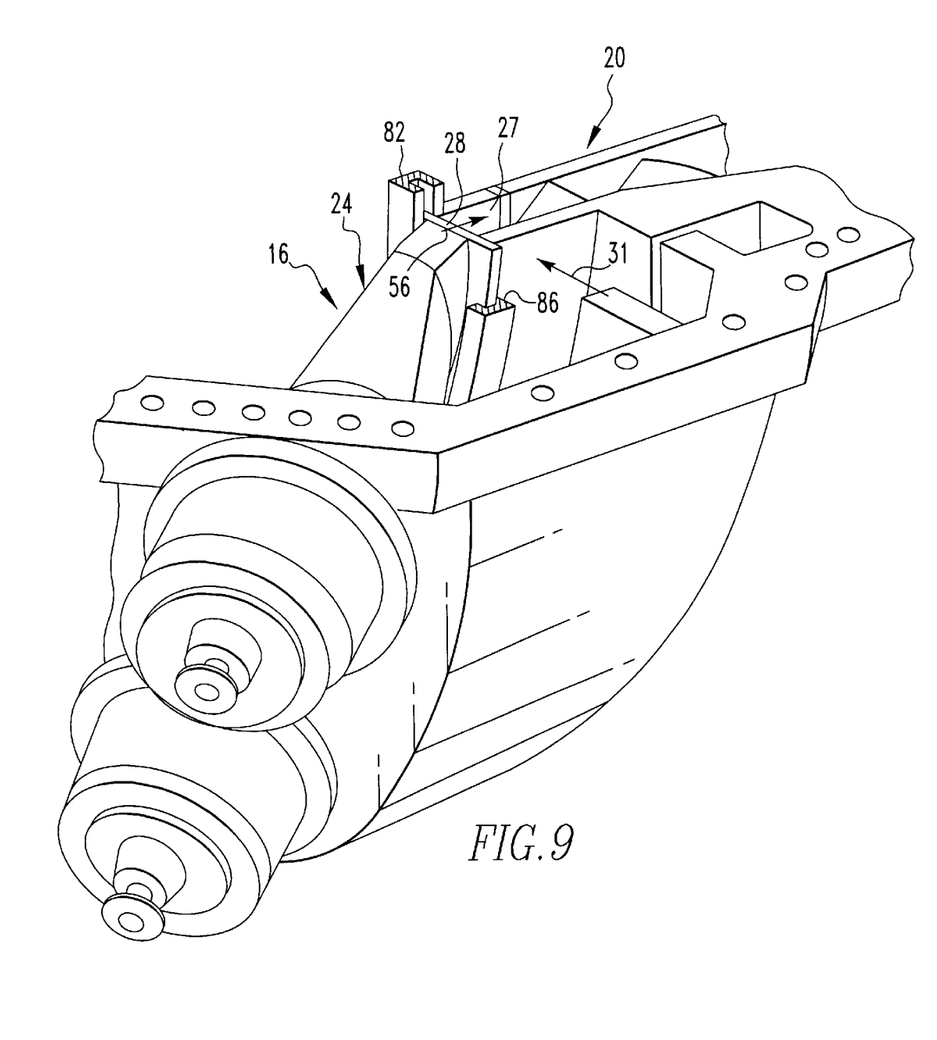
FIG. 9 is an isometric view of a portion of the combustor section of an engine showing a combustor basket mounted to an annular opening to the turbine section of the engine.

As is known in the relevant art, and as is shown generally in FIG. 9, the combustor section of the gas turbine engine typically includes a plurality of combustor baskets that are mounted circumferentially about an annular opening at the upstream end of the turbine section. The air is directed from the compressor section into a pressurized plenum within which the combustor baskets are disposed. The air travels into the combustor baskets where it is mixed with fuel and ignited. The combustion gases flow through the combustor baskets and into the turbine section, thus driving the turbine section and providing power to the compressor section and to the accessory devices.

During operation, it is preferred that the air in the pressurized plenum flow through the combustor baskets instead of leaking directly from the plenum into the turbine section. Combustor baskets accordingly are designed with appropriately shaped combustor transitions that are mounted circumferentially along the annular opening at the upstream end of the turbine section. Each combustor transition is of a shape to "transition" the combustor basket from a circular cross section to an annular sector of the annular opening to the turbine section.

To minimize air leakage between adjacent combustor transitions, it is known to provide one or more ridges on the side faces of adjacent combustor transitions, the ridges being offset from one another to provide a labyrinth seal between adjacent combustor transitions. Each labyrinth seal provides a tortuous path along which any leaking air must travel, with the tortuous path resisting the flow of air therethrough an thus resisting leakage.

While such labyrinth seals between adjacent combustor transitions have been at least partially effective for their intended purpose, such labyrinth seals have not, however, been without limitation. As is known in the relevant art, combustor transitions thermally grow from the time the combustion gas turbine engine is initially started until the time that steady state operation is achieved. A certain level of leakage remains during steady state operation.

The labyrinth seal between adjacent combustor transitions typically includes a pair of ridges on each of the confronting faces of adjacent combustor transitions to provide a pair of peaks and a valley therebetween. The peaks and valley of one confronting face are offset from the peaks and valley of the other confronting face such that when the combustor transitions thermally grow the peaks and valleys of the confronting faces mesh with one another to reduce the gap therebetween and to resist the leakage of air therepast.

While the configuration of such labyrinth seals can be designed about a given steady state operating temperature, such conditions typically are not achieved during startup operation of the engine or at steady state operation of the engine at a temperature other than the design temperature. Leakage through the labyrinth seals is difficult to eliminate regardless of the steady state temperature due to the intermeshing configuration of labyrinth seals which typically permits at least a nominal quantity of air to leak therepast.

It is thus desired to provide an improved sealing device that can be used in conjunction with existing labyrinth seals of adjacent combustor transitions and that can reduce and resist the leakage of air past the labyrinth seals. It is additionally preferred to manufacture such a device out of materials that can withstand the elevated temperatures and pressures typically found in a combustion gas turbine engine.

SUMMARY OF THE INVENTION

A sealing device employed in a labyrinth seal between adjacent combustor transitions of a combustion gas turbine engine includes a frame and a seal member. The frame includes a seat and a connection tab, the seal member being mounted in the seat, and the connection tab being attached to a ridge of the labyrinth seal. The seat is configured to be received in the valley between a pair of adjacent ridges of a first combustor transition, with a ridge of a second combustor transition being compressively received against the seal member during thermal expansion and growth of the combustor transitions and the turbine engine. The seal member is advantageously manufactured out of a plurality of metal fibers, with the metal fibers and the frame each being suited to the elevated temperatures and pressures typically found in the combustion gas turbine engine.

An aspect of the present invention is to provide a sealing device for resisting the flow of gas through a labyrinth seal between a pair of adjacent combustor transitions of a gas turbine engine, the labyrinth seal including a first ridge disposed on each combustor transition, the first ridges being offset and adjacent one another, the general nature of which can be stated as including a seal member having a plurality of metal fibers, an elongated frame having a longitudinal axis, the frame being formed with a seat extending longitudinally along the frame and including a first connection tab protruding from the seat, the first connection tab being structured to be mounted on one of the first ridges of one of the combustor transitions, and the seal member being disposed in the seat.

Another aspect of the present invention is to provide a gas turbine engine, the general nature of which can be stated as including a compressor section, a combustor section, and a turbine section, the compressor, combustor, and turbine sections being in fluid communication with one another, the combustor section including a first combustor transition, a second combustor transition, a labyrinth seal between the first and second combustor transitions, and a sealing device as set forth in the previous paragraph. The labyrinth seal includes a first ridge mounted on the first combustor transition and extending in a direction generally toward the second combustor transition and a first ridge mounted on the second combustor transition extending in a direction generally toward the first combustor transition, the first ridges of the first and second combustor transitions being offset from one another.

Still another aspect of the present invention is to provide a method of resisting the flow of gas through a labyrinth seal between a pair of adjacent combustor transitions of a gas turbine engine, the labyrinth seal including a first ridge disposed on each combustor transition, the first ridges being offset and adjacent one another, the general nature of which can be stated as including the steps of positioning a seal member in a frame, the seal member including a plurality of metal fibers, the frame including a seat and a first connection tab extending outwardly from the seat, mounting the first connection tab to the first ridge of one of the combustor transitions, and compressing the first ridge of the other combustor transition into the seal member.

BRIEF DESCRIPTION OF THE DRAWINGS

The preferred embodiments of the invention, illustrative of the best modes in which Applicant has contemplated applying the principles of the invention, are set forth in the following description and are shown in the drawings and are particularly and distinctly pointed out and set forth in the appended Claims.

Similar numerals refer to similar parts throughout the specification.

DETAILED DESCRIPTION OF THE PREFERRED EMBODIMENTS

A sealing device in accordance with the present invention is indicated generally at the numeral 4 in FIGS. 1–2 and 4–5. The sealing device 4 is advantageously employed in a combustion gas turbine engine 8 to improve the performance of the engine 8 according to various criteria.

Figure 3:
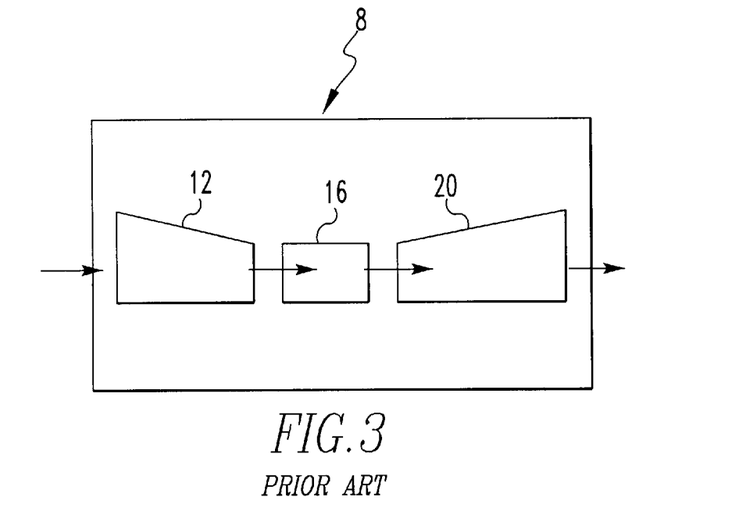
FIG. 3 is a schematic view of a combustion gas turbine engine employing the sealing device.

As is depicted generally in the schematic view of the engine 8 in FIG. 3, the engine 8 includes a compressor section 12, a combustor section 16, and a turbine section 20 through which a quantity of air serially flows, as is depicted generally by the arrows in FIG. 3. The air is compressed by the compressor section 12 and flows into the combustor section 16 where it is mixed with a quantity of fuel and is ignited. The combustion gases travel into the turbine section 20 which drives a shaft that operates the compressor section 12 and is operatively connected with and operates auxiliary machinery such as electrical generators and other such devices.

Figure 4:
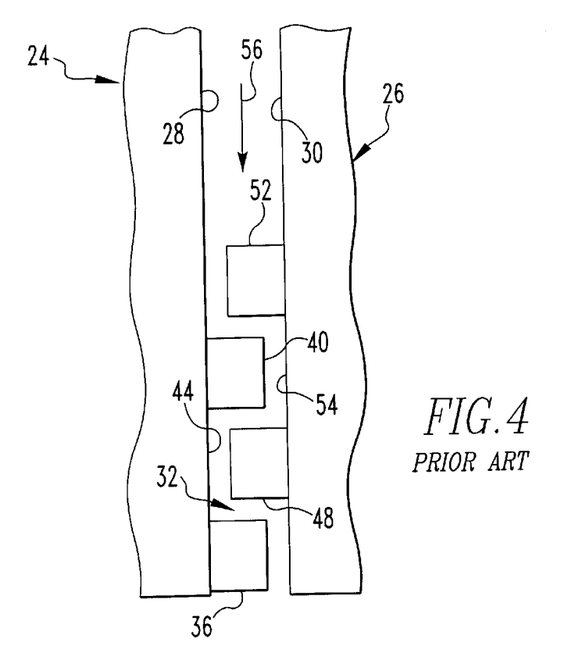
FIG. 4 is an end view of a labyrinth seal between a pair of adjacent combustor transitions.

With particular reference to FIGS. 4 and 9, the combustor section 16 includes a first combustor transition 24 and a second combustor transition 26 that are arranged side-by-side along and operatively connected with an annular opening 27 (FIG. 9) at the upstream end of the turbine section 20. The first combustor transition 24 includes a first confronting face 28, and the second combustor transition 26 includes a second confronting face 30. The first and second confronting faces 28 and 30 are each outside side walls of the adjacent first and second combustor transitions 24 and 26, respectively, the first and second confronting faces 28 and 30 being in confronting relation with one another.

With further reference to FIG. 4, which is a view of a portion of the first and second combustor transitions 24 and 26 taken generally in the direction pointed by the arrow 31 of FIG. 9, a labyrinth seal 32 is disposed on the first and second confronting faces 28 and 30, the labyrinth seal 32 being operationally disposed between the first and second combustor transitions 24 and 26. More specifically, the labyrinth seal 32 includes a first downstream ridge 36 and a first upstream ridge 40 extending outwardly from the first confronting face 28, as well as second downstream ridge 48 and a second upstream ridge 52 extending outwardly from the second confronting face 30. The first and second downstream ridges 36 and 48 are each spaced a small distance in the downstream direction from the first and second upstream ridges 40 and 52, respectively, with respect to the general direction of air flow through the engine 8. While the first confronting face 28 of the first combustor transition 24 is shown in FIG. 9, the first downstream and upstream ridges 36 and 40 that extend outwardly from the first confronting face 28 are not shown in FIG. 9 merely for purposes of clarity.

The first and second downstream and upstream ridges 36, 40, 48, and 52 are each of a substantially rectangular cross section and extend into the plane of the paper of FIG. 4. The first downstream and upstream ridges 36 and 40 are spaced from one another such that a first valley 44 is defined therebetween. It can be seen that the first downstream and upstream ridges 36 and 40 are offset from the second downstream and upstream ridges 48 and 52 such that the second downstream ridge 48 can be at least partially received in the first valley 44 between the first downstream and upstream ridges 36 and 40.

As is known in the relevant art, the first and second combustor transitions 24 and 26 experience thermal expansion from the point of initial engine startup until the engine 8 has achieved steady state operation. Since the first and second combustor transitions 24 and 26 are circumferentially distributed about the engine 8 along the opening 27 (FIG. 9), such thermal growth results in a reduction of the space between the adjacent first and second combustor transitions 24 and 26.

More specifically, during such thermal growth, the first and second confronting faces 28 and 30 thermally travel from a first position at a first distance from one another to a second position at a second closer distance from one another. Such thermal growth in effect reduces the spaces or gaps between adjacent combustor transition.

The growth of the first and second confronting faces 28 and 30 toward one another also results in the second downstream ridge 48 being received in the first valley 44 between the first downstream and upstream ridges 36 and 40. The first upstream ridge 40 is similarly received in a second valley 54 defined between the second downstream and upstream ridges 48 and 52. It is noted that FIGS. 4 and 5 generally depict the labyrinth seal 32 during steady state operation of the engine 8 and after such thermal growth has occurred. An arrow 56 in FIGS. 4, 5 and 9 depicts the leakage direction that air flows in undesirably leaking through the labyrinth seal 32 between the first and second combustor transitions 24 and 26 and directly into the turbine section 20.

As is known in the relevant art, and as can be seen in FIG. 4, the first and second downstream and upstream ridges 36, 40, 48, and 52 of the labyrinth seal 32 provide a tortuous path for resisting the leakage of air when flowing in the leakage direction 56 from the combustor section 26 directly into the turbine section 20. In this regard, it also can be seen that the 5 aforementioned thermal growth experienced by the first and second combustor transitions 24 and 26 acts to decrease the distance between the first and second confronting faces 28 and 30, which thereby increases the extent to which the first downstream and upstream ridges 36 and 40 inter-mesh with the second downstream and upstream ridges 48 and 52. Such increased inter-meshing increases the extent to which the labyrinth seal 32 resists the leakage of air therepast by increasing the tortuous nature of the path through which leaking air must travel. It is understood that the labyrinth seal 32 will permit a greater leakage of air therepast during engine startup than when the engine 8 is operating at a thermal steady state condition after the cessation of thermal growth.

Figure 1:
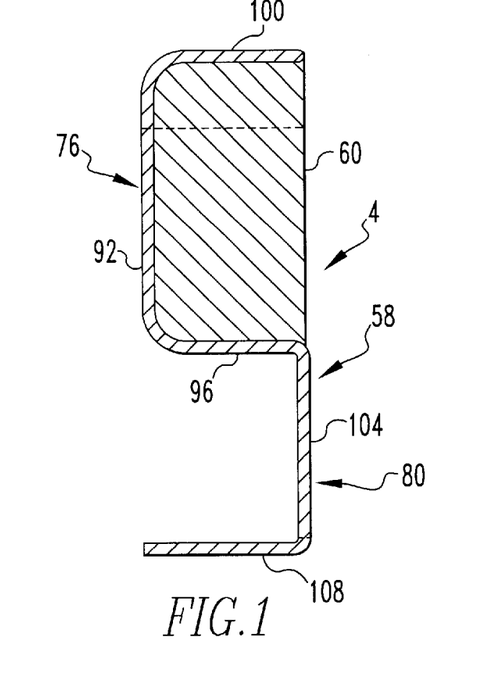
FIG. 1 is a sectional view taken along line 1—1 of FIG. 2 of a first embodiment of a sealing device in accordance with the present invention.
Figure 2:
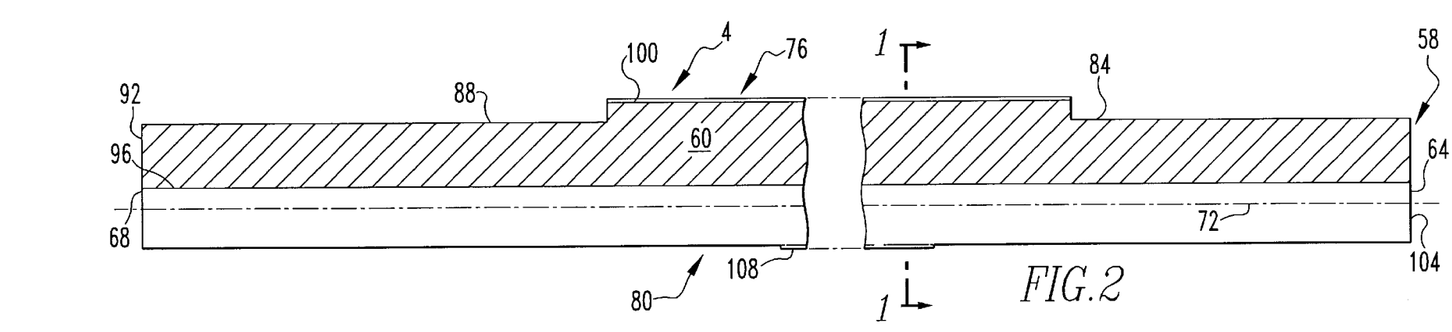
FIG. 2 is a front elevational view of the first embodiment.
Figure 5:
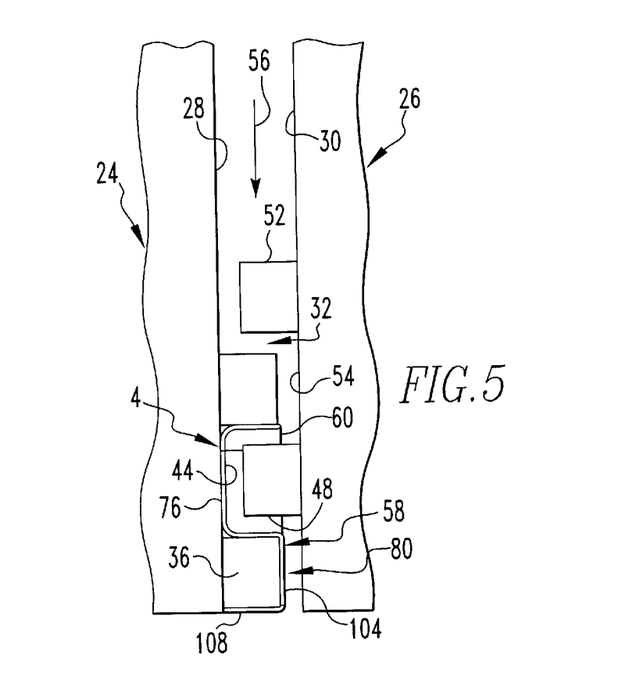
FIG. 5 is a view similar to FIG. 4 except showing the first embodiment installed on the labyrinth seal.

Referring to FIGS. 1, 2, and 5, the sealing device 4 includes a frame 58 and a seal member 60. The frame 58 is an elongated member having a first end 64 opposite a second end 68 and includes a longitudinal axis 72 extending between the first and second ends 64 and 68. The frame 58 is preferably manufactured out of a material suited to withstand high temperatures and pneumatic pressures, such as a sheet of nickel-based alloy, although other appropriate materials may be employed without departing from the present invention.

The frame 58 is formed with a substantially U-shaped seat 76 and a substantially L-shaped first connection tab 80 connected with one another. The seat 76 is substantially U-shaped in a plane perpendicular with the longitudinal axis 72, and the first connection tab 80 is substantially L-shaped in a plane perpendicular with the longitudinal axis 72. The seat 76 and the first connection tab 80 together result in the frame 58 being substantially S-shaped in a plane perpendicular to the longitudinal axis 72 along at least a portion of the frame 58.

The seal member 60 is received in the seat 76 and is preferably fixedly attached thereto. The seal member 60 is manufactured out of a fiber metal felt such as that sold under the name Feltmetal® by Technetics Corporation of DeLand, Fl., USA, with the metal fibers preferably being manufactured out of a material such as the alloy Hastelloy-X. It is understood, however, that other appropriate materials may be employed in manufacturing the seal member 60 without departing from the present invention. The metal fibers are in the form of a felt or other configuration with a plurality of mutually interconnected openings extending therethrough. The seal member 60 can be fixedly mounted to the seat 76 by any of a wide variety of known methods such as brazing, sintering, and other appropriate methods. Still alternatively, in certain applications the seal member 60 may not be fixedly attached to the seat 76.

As is best shown in FIG. 9, the embodiment of the combustor section 16 depicted herein includes an inner mouth seal 82 and an outer mouth seal 86 that each extend circumferentially within the combustor section 16 and retain a portion of the first and second combustor transitions 24 and 26 therebetween (the second combustor transition 26 not being shown in FIG. 9 for purposes of clarity). While only a portion of the inner and outer mouth seals 82 and 86 are shown in FIG. 9, it is understood that the inner and outer mouth seals 82 and 86 are annular members that extend about the circumference of the engine 8 and are each formed with a slot that receives an opposite edge of the attachment plate of each combustor transition.

As is best shown in FIG. 2, the sealing device 4 is thus formed with a first relief cutout 84 adjacent the first end 64 and a second relief cutout 88 adjacent the second end 68 to permit the sealing device 4 to avoid interference with the inner and outer mouth seals 82 and 86 of the engine 8. It is understood, however, that in other configurations of the engine 8, the first and second relief cutouts 84 and 88 may be reconfigured or may be entirely absent from the sealing device 4 depending upon the presence or absence of and the specific configurations of the inner and outer mouth seals 82 and 86.

As is best shown, in FIG. 1, the seat 76 includes a base 92, a first wall 96, and a second wall 100. The first and second walls 96 and 100 extend from opposite sides of the base 92 such that the first and second walls 96 and 100 and the base 92 together are of a substantially U-shaped configuration. As is best shown in FIG. 2, the first wall 96 extends between the first and second ends 64 and 68, but the second wall 100 terminates at the first and second relief cutouts 84 and 88. As such, while the seat 76 is of a substantially U-shaped configuration in a plane perpendicular with the longitudinal axis 72 between the first and second relief cutouts 84 and 88, such is not the case with regard to planes extending through the first and second relief cutouts 84 and 88.

The first connection tab 80 includes a first leg 104 extending perpendicularly outward from the edge of the first wall 96 opposite the connection thereof with the base 92 and in a direction generally away from the second wall 100. The second leg 108 extends perpendicularly from the edge of the first leg 104 opposite its connection with the first wall 96 and is oriented substantially parallel with the first wall 96. As can be seen in FIG. 1, the first wall 96 and the first connection tab 80 are together substantially U-shaped and are configured to receive the first downstream ridge 36 therein, as will be set forth more fully below.

It can further be seen from FIGS. 1 and 2 that while the first leg 104 extends between the first and second ends 64 and 68, the second leg 108 extends less than fully the distance between the first and second ends 64 and 68. The second leg 108 is cut short at the opposite ends thereof in order to avoid interference between it and the inner and outer mouth seals 82 and 86 as well as other structures of the engine 8. It is understood, however, that depending upon the presence or absence of the inner and outer mouth seals 82 and 86 and the specific configurations thereof, the second leg 108 potentially may be cut short in a different fashion or may not be cut short at all.

As can be seen in FIG. 5, the sealing device 4 is mounted on the first combustor transition 24 with the seat 76 disposed in the first valley 44 between the first downstream and upstream ridges 36 and 40, and with the first connection tab 80 extending across two substantially perpendicular faces of the first downstream ridge 36. In this regard, it is preferred that the seat 76 be snugly disposed in the first valley 44 with minimal play therebetween, and with the first connection tab 80 similarly mounted on the first downstream ridge 36 with minimal play between the first downstream ridge 36 and the first connection tab 80 and the first wall 96. Such conformity of the frame 58 to the first combustor transition 24 facilitates the secure attachment of the sealing device 4 on the first combustor transition 24 and minimizes turbulence-induced movement and rattling of the sealing device 4. Once the sealing device 4 is mounted on the first downstream ridge 36, it is preferred that the second leg 108 be resistance spot welded or otherwise fixedly attached to the first downstream ridge 36.

When the engine 8 is not in operation, the second downstream ridge 48 likely at most only nominally protrudes between the first downstream and upstream ridges 36 and 40, and thus at most only nominally is compressed against the seal member 60. The seal member 60 is configured to be of a height such that it completely fills the seat 76 between the first and second walls 96 and 100, and is sufficiently long to extend substantially the length of the first and second confronting faces 28 and 30 of the first and second combustor transitions 24 and 26 into the page of FIG. 5, except for the first and second relief cutouts 84 and 88.

During engine startup, the first and second combustor transitions 24 and 26 begin to thermally grow such that the first and second confronting faces 28 and 30 become closer to one another. In so doing, the second downstream ridge 48 is received between the first downstream and upstream ridges 36 and 40 and progressively compressively engages the seal member 60.

Inasmuch as the seal member 60 is manufactured out of a metallic felt that is compressible, the seal member 60, while being compressed by the second downstream ridge 48, remains within the tortuous path through the labyrinth seal 32 and provides resistance to air flowing in the leakage direction 56. As the second downstream ridge 48 becomes progressively more compressed against the seal member 60, the seal member 60 itself becomes compressed, and in so doing the mutually interconnected air passages extending therethrough become likewise compressed and resist the flow of air therethrough. It can be seen, therefore, that the progressive compression of the second downstream ridge 48 against the seal member 60 not only increases the tortuous path along which air flowing in the leaking direction 56 must travel when leaking directly between the combustor section 16 and the turbine section 20, but such thermal growth additionally results in the seal member 60 progressively providing greater resistance to such leaking air.

The seal member 60 thus advantageously progressively resists the flow of air in the leakage direction 56 during startup of the engine 8, and provides auxiliary resistance to the flow of air through the labyrinth seal 32 during steady state operation of the engine 8.

It can further be seen that the frame 58 that supports the seal member 60 retains the seal member 60 in the first valley 44 during startup and during steady state operation of the engine 8. With the seal member 60 disposed in the seat 76, and the first connection tab 80 fixedly attached to the first downstream ridge 36, the seal member 60 is retained between the first downstream and upstream ridges 36 and 40 despite substantial air pressure seeking to flow through the labyrinth seal 32 in the leakage direction 56. The frame 58 thus retains the seal member 60 in its advantageous location in the first valley 44 and resists the seal member 60 from being moved or blown out from the first valley 44 by air flowing through the engine 8 in the leakage direction 56.

The sealing device 4 thus advantageously resists leakage of air in the leakage direction within the engine 8 and enhances the efficiency thereof. The sealing device 4 is configured to be attached within the labyrinth seal 32 of an existing engine 8 without substantial modification thereto, and additionally may be employed in the construction of a new engine 8 without substantially modifying the assembly methodology thereof.

It is further understood that the sealing device 4 may be of other configurations without departing from the present invention. For instance, the first connection tab 80 may be of numerous alternate configurations and may be connected with numerous different parts of the first combustor transition 24 and/or the second combustor transition 28. Alternatively, or in addition thereto, the seal member 60 can be of different shapes and can be carried in different fashions in seats 76 having differing configurations. It can thus be seen that while at least a first example of the frame 58 and the seal member 60 of the sealing device 4 have been discussed herein, numerous other configurations in accordance with the present invention are possible.

Figure 6:
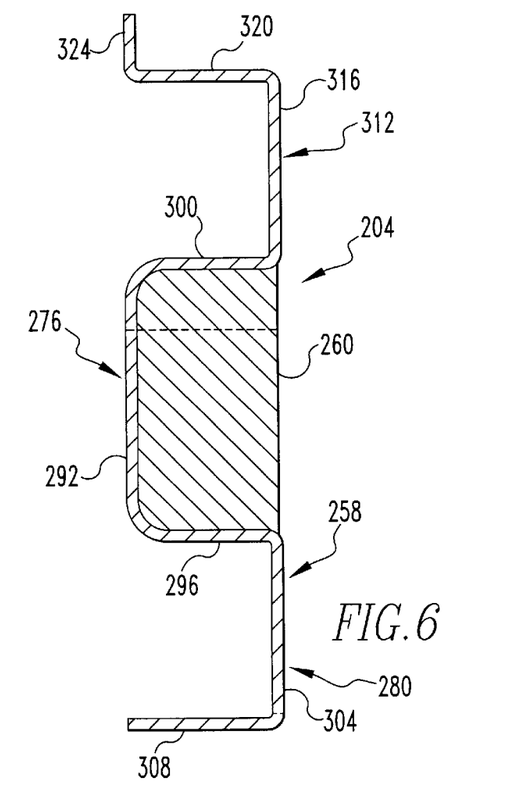
FIG. 6 is a sectional view taken along line 6—6 of FIG. 7 of a second embodiment of the sealing device of the present invention.
Figure 7:
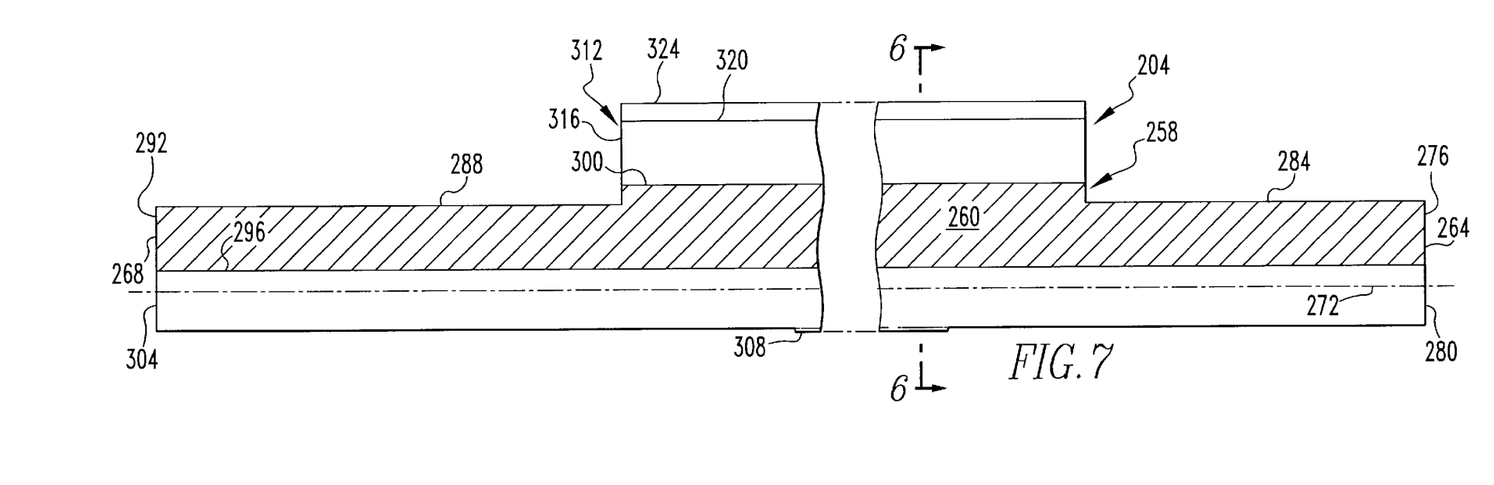
FIG. 7 is a front elevational view of the second embodiment.
Figure 8:
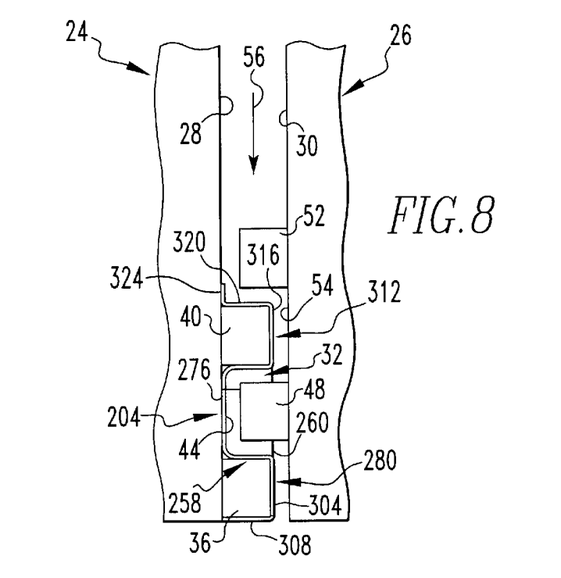
FIG. 8 is an end view of a labyrinth seal between adjacent combustor transitions with the second embodiment mounted thereon.

A second embodiment of the sealing device of the present invention is indicated generally at the numeral 204 in FIGS. 6–8. The sealing device 204 includes a frame 258 and a seal member 260. The frame 258 is similar to the frame 58 in that it is an elongated member terminating at opposite first and second ends 264 and 268, with a longitudinal axis 272 extending between the first and second ends 264 and 268, and in that the frame 258 also includes a substantially U-shaped seat 276 and a substantially L-shaped first connection tab 280 extending from the seat 276.

The frame 258 is different than the frame 58, however, in that the frame 258 additionally includes a second connection tab 312 extending from the seat 276. The second connection tab 312 extends from the seat 276 in a direction substantially opposite that in which the first connection tab 280 extends from the seat 276.

As is best shown in FIG. 6, the seat 276 includes a base 292, a first wall 296 and a second wall 300, the first and second walls 296 and 300 extending parallel with one another from opposite sides of the base 292. The first connection tab 280 includes a first leg 304 extending substantially perpendicularly outward from the first wall 296 and a second leg 308 extending substantially perpendicularly away from the first leg 304. The first connection tab 280 is structured to be mounted on and resistance welded to the first downstream ridge 36.

The second connection tab 312 includes a first leg 316, a second leg 320, and a third leg 324. The first leg 316 extends substantially perpendicularly outward from the second wall 300 in a direction substantially opposite and away from the first leg 304 of the first connection tab 280. The second leg 320 extends substantially perpendicularly from the first leg 316, and the third leg 324, in turn, extends substantially perpendicularly from the second leg 320.

As is best shown in FIG. 7, the sealing device 204 is formed with first and second relief cutouts 284 and 288 to avoid interference with the inner and outer mouth seals 82 and 86. The first and second relief cutouts 284 and 288 extend into the second connection tab 312, whereby the second connection tab 312 extends less than fully the distance between the first and second ends 264 and 268. The second connection tab 312 thus is configured extend along and adjacent the first upstream ridge 40 when installed on the first combustor transition 24 (FIG. 8), although it can be seen that the presence of the first and second relief cutouts 284 and 288 prevent the second connection tab 312 from extending fully the length of the first upstream ridge 40. It is understood, however, that the first and second relief cutouts 284 and 288 may be configured differently depending upon the inner and outer mouth seals 82 and 86.

The second leg 308 of the first connection tab 280 is preferably resistance spot welded or otherwise fixedly attached to the first downstream ridge 36, and the third leg 324 of the second connection tab 312 is preferably resistance spot welded or otherwise fixedly attached to the first confronting face 28 of the first combustor transition 24.

In so mounting the sealing device 204 on the first combustor transition 24, the sealing device 204 is fixedly mounted on the first combustor transition 24 both downstream as well as upstream from the seal member 260. The seal member 260 is preferably fixedly attached to the seat 276, and the configuration of the frame 258 with both the first and second connection tabs 280 and 312 being fixedly attached to the first combustor transition even more securely fastens the sealing device 204 to the first combustor transition 24 than the sealing device 4 was mounted thereto. Such enhanced attachment of the sealing device 204 permits it to be suited to applications having greater air velocities and/or larger gaps within a labyrinth seal, as well as other appropriate applications.

The sealing device 204 provides progressive resistance to the flow of air in the leakage direction 56 and is compressible by the second downstream ridge 48 during thermal growth of the first and second combustor transitions 24 and 26 during engine startup. The sealing device 204 thus advantageously improves the efficiency and operating characteristics of the engine 8 by resisting the leakage of air in the leakage direction 56 through the labyrinth seal 32.

While a number of particular embodiments of the method of the present invention have been described herein, it is understood that various changes, additions, modifications, and adaptations may be made without departing from the scope of the present invention, as set forth in the following Claims.

What is claimed is:

1. A sealing device for resisting the flow of gas through a labyrinth seal between a pair of adjacent combustor transitions of a gas turbine engine, the labyrinth seal including a first ridge disposed on a side wall of each combustor transition, the first ridges being offset along a gas flow leakage path between the side walls of the combustor transitions and adjacent one another, the sealing device comprising:

a seal member having a plurality of metal fibers;

an elongated frame having a longitudinal axis, the frame being formed with a seat extending longitudinally along the frame and including a first connection tab protruding from the seat, the first connection tab being structured to be mounted on one of the first ridges of one of the combustor transitions; and the seal member being disposed in the seat and being structured to be positioned at least partially opposite the other of the first ridges on the other of the combustor transitions.

2. The sealing device as set forth in claim 1, in which the seal member is fixedly mounted to the frame.

3. The sealing device as set forth in claim 1, in which the seat is substantially U-shaped in a plane perpendicular to the longitudinal axis.

4. The sealing device as set forth in claim 1, in which the first connection tab includes a first leg extending substantially the length of the frame.

5. The sealing device as set forth in claim 4, in which the first connection tab further includes a second leg, the second leg extending along at least a portion of the first leg, the first and second legs being substantially perpendicular to one another in a plane perpendicular to the longitudinal axis.

6. The sealing device as set forth in claim 5, in which the frame is substantially S-shaped in a plane perpendicular with the longitudinal axis.

7. The sealing device as set forth in claim 4, in which at least one end of the sealing device is formed with a relief cutout.

8. The sealing device as set forth in claim 1, in which one of the pair of combustor transitions includes a second ridge, in which the first ridge of the other combustor transition is receivable between the first and second ridges of the one combustor transition, and in which the frame includes a second connection tab protruding from the seat, the second connection tab being structured to be mounted on the second ridge of the one combustor transition.

9. The sealing device as set forth in claim 8, in which the seat includes a base, a first wall, and a second wall, the first and second walls extending from opposite sides of the base such that the first and second walls and base together are of a substantially U-shaped configuration in a plane perpendicular with the longitudinal axis, the U-shaped aspect being structured to face the at least first ridge of the other combustor, the at least first connection tab protruding outwardly from the first wall, and the second connection tab protruding outwardly from the second wall.

10. The sealing device as set forth in claim 9, in which the first connection tab includes a first leg extending outwardly from the first wall and a second leg extending from the first leg, the first and second legs being substantially perpendicular with one another in a plane perpendicular to the longitudinal axis, at least a portion of the first connection tab being structured to extend in a direction toward the one combustor, and in which the second connection tab includes a first leg extending from the second wall and a second leg extending from the first leg of the second connection tab, the first and second legs of the second connection tab being substantially perpendicular with one another in a plane perpendicular to the longitudinal axis, at least a portion of the second connection tab being structured to extend in a direction toward the one combustor.

11. The sealing device as set forth in claim 10, in which the first leg of the first connection tab extends substantially the length of the first wall.

12. The sealing device as set forth in claim 11, in which the first leg of the second connection tab extends substantially the length of the second wall.

13. The sealing device as set forth in claim 10, in which the second connection tab includes a third leg extending from the second leg of the second connection tab, the second and third legs of the second connection tab being oriented substantially perpendicular with one another in a plane perpendicular with the longitudinal axis, the third leg being structured to extend in a direction parallel to the side wall of the one combustor.

14. A gas turbine engine comprising:

a compressor section;

a combustor section;

a turbine section;

the compressor, combustor, and turbine sections being in fluid communication with one another;

the combustor section including a first combustor transition, a second combustor transition, a labyrinth seal between the first and second combustor transitions, and a sealing device;

the labyrinth seal including a first ridge mounted on the first combustor transition and extending in a direction generally toward the second combustor transition and a first ridge mounted on the second combustor transition and extending in a direction generally toward the first combustor transition, the first ridges of the first and second combustor transitions being offset from one another;

the sealing device including an elongated frame having a longitudinal axis and a seal member having a plurality of metal fibers, the frame being formed with a seat extending longitudinally along the frame and including a first connection tab protruding from the seat, the seal member being disposed in the seat;

the first connection tab being mounted on one of the first ridges of one of the first and second combustor transitions.

15. The gas turbine engine as set forth in claim 14, in which the first connection tab includes a first leg extending substantially the length of the frame and a second leg extending along at least a portion of the first leg, the first and second legs being substantially perpendicular to one another in a plane perpendicular to the longitudinal axis.

16. The gas turbine engine as set forth in claim 15, in which one of the first and second combustor transitions includes a second ridge, in which the first ridge of the other of the first and second combustor transitions is receivable between the first and second ridges of the one combustor transition, and in which the frame includes a second connection tab protruding from the seat, the second connection tab being mounted on the second ridge of the one combustor transition.

17. The gas turbine engine as set forth in claim 16, in which the first and second connection tabs are each at least partially L-shaped in a plane perpendicular to the longitudinal direction.

18. A method of resisting the flow of gas through a labyrinth seal between a pair of adjacent combustor transitions of a gas turbine engine, the labyrinth seal including a first ridge disposed on each combustor transition, the first ridges being offset and adjacent one another, the method comprising the steps of:

positioning a seal member in a frame, the seal member including a plurality of metal fibers, the frame including a seat and a first connection tab extending outwardly from the seat;

mounting the first connection tab to the first ridge of one of the combustor transitions; and compressing the first ridge of the other combustor transition into the seal member.

19. The method as set forth in claim 18, in which the step of compressing includes the step of thermally expanding the other combustor transition.

20. The method as set forth in claim 18, in which the one of the combustor transitions includes a second ridge and in which the frame includes a second connection tab, and further comprising the step of mounting the second connection tab to the second ridge, and in which the step of compressing the first ridge of the other combustor transition includes the step of receiving the first ridge of the other combustor transition between the first and second ridges of the one combustor transition.

* * * * *